(12) United States Patent
Vienne et al.

(10) Patent No.: US 7,221,840 B2
(45) Date of Patent: May 22, 2007

(54) MICROSTRUCTURED OPTICAL FIBRE WITH CLADDING RECESS, A METHOD OF ITS PRODUCTION, AND APPARATUS COMPRISING SAME

(75) Inventors: Guillaume Vienne, Copenhagen V (DK); Christian Jakobsen, Virum (DK); Jes Broeng, Birkerod (DK); Jacob Riis Folkenberg, Kokkedal (DK); Peter M. W. Skovgaard, Birkerod (DK)

(73) Assignee: Crystal Fibre A/S, Birkerod (DK)

( * ) Notice: Subject to any disclaimer, the term of this patent is extended or adjusted under 35 U.S.C. 154(b) by 282 days.

(21) Appl. No.: 10/507,722

(22) PCT Filed: Mar. 17, 2003

(86) PCT No.: PCT/DK03/00180

§ 371 (c)(1),
(2), (4) Date: Feb. 9, 2005

(87) PCT Pub. No.: WO03/079077

PCT Pub. Date: Sep. 25, 2003

(65) Prior Publication Data

US 2005/0117860 A1 Jun. 2, 2005

Related U.S. Application Data

(60) Provisional application No. 60/364,118, filed on Mar. 15, 2002.

(51) Int. Cl.
*G02B 6/04* (2006.01)

(52) U.S. Cl. .................. 385/126; 385/115; 385/123; 385/125

(58) Field of Classification Search ................ 385/115, 385/123–126
See application file for complete search history.

(56) References Cited

U.S. PATENT DOCUMENTS

| | | |
|---|---|---|
| 5,259,059 A | 11/1993 | Abramov |
| 5,729,641 A | 3/1998 | Chandonnet et al. |
| 5,802,236 A | 9/1998 | DiGiovanni et al. |
| 5,854,865 A | 12/1998 | Goldberg |

(Continued)

FOREIGN PATENT DOCUMENTS

EP 0 320 990 6/1989

(Continued)

OTHER PUBLICATIONS

Furusawa et al., "Cladding pumped Ytterbium-doped fiber laser with holey inner and outer cladding", Optics Express, vol. 9, No. 13, Dec. 2001, pp. 714-720.*

(Continued)

*Primary Examiner*—Frank G. Font
*Assistant Examiner*—Michael P. Mooney

(57) ABSTRACT

A microstructured optical fibre comprising an inner cladding and an outer cladding; said outer cladding comprising elongated outer cladding features extending in an axial direction of the fibre, and at least one cladding recess extending at least partly through the outer cladding in a radial direction to the inner cladding; said cladding recess providing optical access to the inner cladding; a method of forming a cladding recess in such an optical fibre comprising a step of collapsing a part of the outer cladding features by use of a heat source; an apparatus comprising such a microstructured optical fibre, preferably a laser or an amplifier.

87 Claims, 8 Drawing Sheets

U.S. PATENT DOCUMENTS

| | | | |
|---|---|---|---|
| 5,907,652 | A | 5/1999 | DiGiovanni et al. |
| 5,999,673 | A | 12/1999 | Valentin et al. |
| 6,243,515 | B1 | 6/2001 | Heflinger et al. |
| 6,317,537 | B1 | 11/2001 | Ionov et al. |
| 2005/0163426 | A1* | 7/2005 | Fermann et al. ............ 385/37 |

FOREIGN PATENT DOCUMENTS

| | | |
|---|---|---|
| WO | 00/54377 | 9/2000 |
| WO | 01/42829 | 6/2001 |
| WO | 03/019257 | 3/2003 |

OTHER PUBLICATIONS

Birks, et al., "2D Photonic Band Gap Structures in Fibre Form," published in Photonic Band Gap Materials, Kluwer, 1996.

Dominic, et al., "110W Fiber Laser," Conference on Lasers and Electro Optics, CPD11-1, 1999.

Broeng, et al., "Photonic Crystal Fibers: A New Class of Optical Waveguides," Optical Fiber Technology, vol. 5, pp. 305-330, 1999.

Furusawa, et al., "Cladding Pumped Ytterbium-doped Fiber Laser with Holey Inner and Outer Cladding," Optics Express, vol. 9, No. 13, pp. 714-720, Dec. 2001.

Johnson, et al., "Block-iterative Frequency-domain Methods for Maxwells's Equations in a Planewave Basis," Optics Express, pp. 173-190, 2001.

Cheo, et al., "A High-Brightness Laser Beam From a Phase-Locked Multicore Yb-Doped Fiber Laser Array," IEEE Photonics Technology Letters, vol. 13, No. 5, pp. 439-441, May 2001.

* cited by examiner

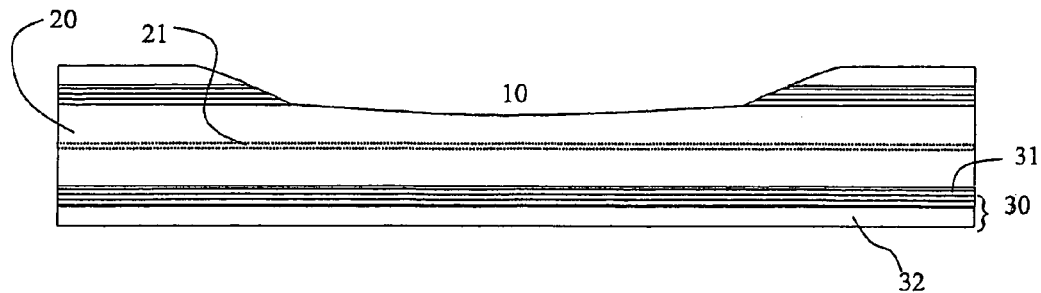
Fig. 1a
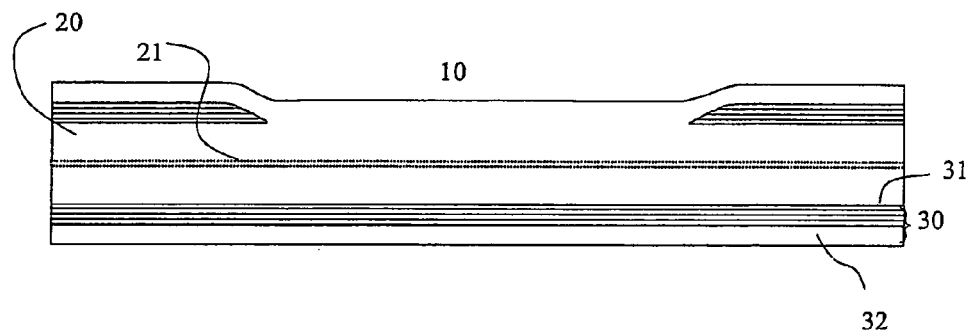
Fig. 1b
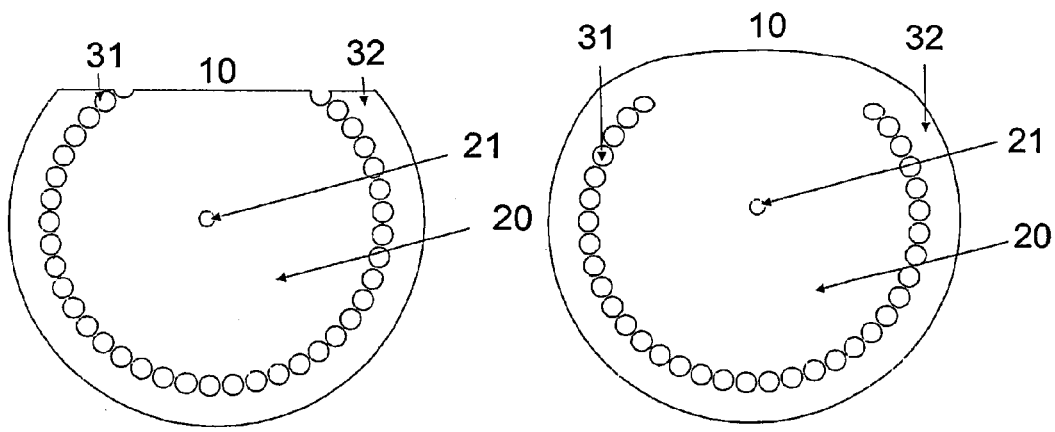
Fig. 2a                    Fig. 2b

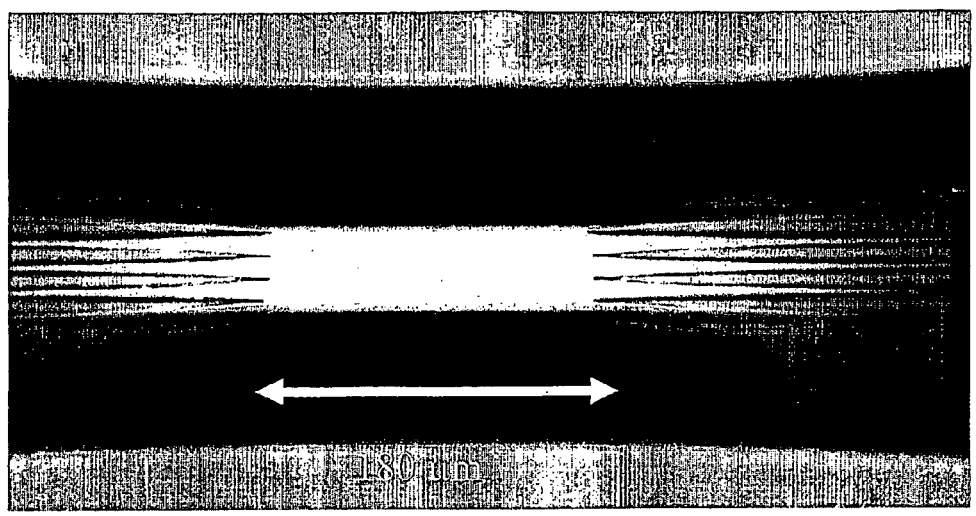
Fig. 3a
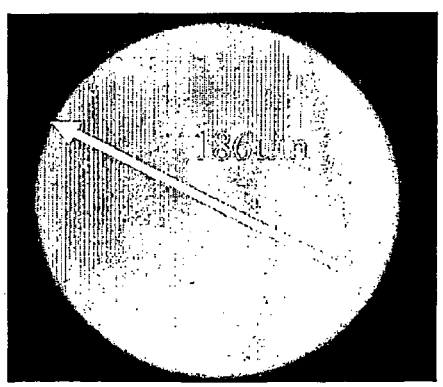 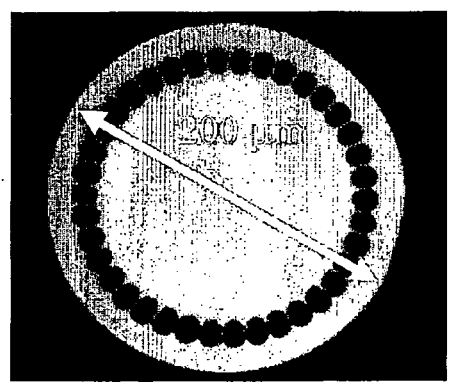
Fig. 3b                    Fig. 3c

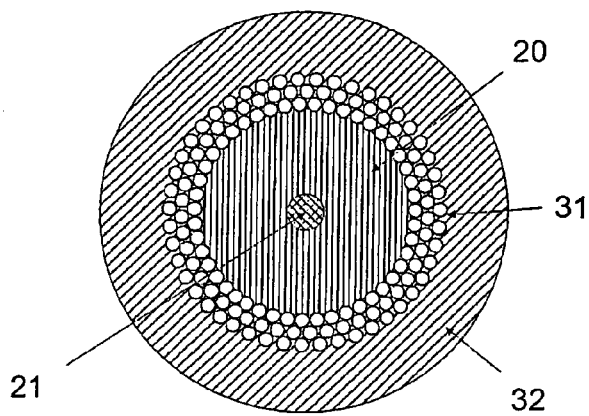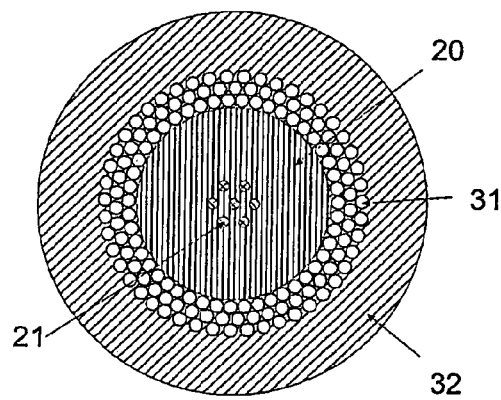
Fig 4a
Fig. 4b
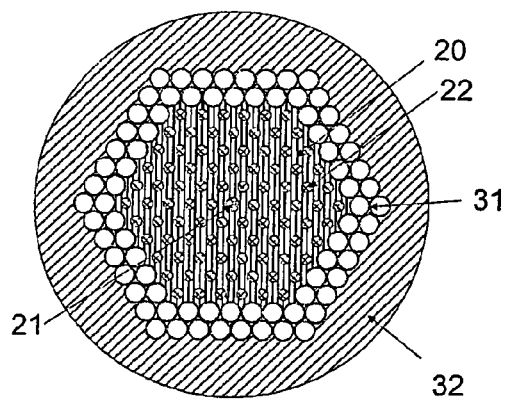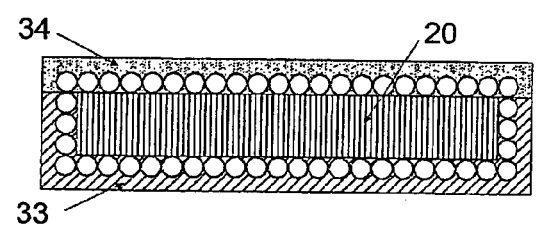
Fig 4c
Fig. 4d

MICROSTRUCTURED OPTICAL FIBRE WITH CLADDING RECESS, A METHOD OF ITS PRODUCTION, AND APPARATUS COMPRISING SAME This application is a 371 of PCT/DK03/00180 Mar. 17, 2003 which claims benefit of 60/364,118 Mar. 15, 2002.

1. BACKGROUND OF THE INVENTION

The present invention relates to a microstructured optical fibre with cladding recess, preferably a microstructured optical fibre exhibiting a high numerical aperture; a method of its production; and an apparatus comprising a length of such a microstructured fibre, preferably a side-pumped optical fibre laser or optical fibre amplifier.

1. The Technical Field

Today optical fibres are mainly used in point to point communication were the power transmitted remains modest, rarely exceeding 100 mW. But with the deployment of metropolitan networks large saturation power amplification is sought, to allow for large signal splitting ratios at nodes. The advent of high power is also expected to open new markets to fibre lasers such as marking, thermal printing, inter-satellite communication, and material processing.

In recent years the power delivered by laser diodes in form of single stripes, bars, or arrays has increased rapidly.

Because of their compactness, high efficiency (electrical-to-optical power conversion in excess of 40%), high reliability, and steadily decreasing price/watt they are progressively replacing other laser systems. But these powerful sources (several W to several 100 W) are highly multimode. This limits the spot size that can be achieved at focus. In most applications their brightness (or radiance) needs to be significantly enhanced.

2. Prior Art Disclosures

A particularly efficient technique first suggested by Snitzer et al., the so-called cladding pumping technique, is now widely used, see for example EP 88121151. This technique makes use of a double-clad optical fibre, hereinafter called standard optical fibre. Snitzer et al. discloses a double clad fibre with a small core, typically a few micrometers in diameter that is single-mode at an emission wavelength. The core is doped with active elements such as rare earth elements, and it is embedded in—or surrounded by—an inner cladding that acts as a (large) multimode waveguide. The pump is launched into the inner cladding, where after it is absorbed in the core and re-emitted at a signal wavelength from the core—thereby enabling lasing or amplification to take place in the core.

Recently, using a cladding pumping technique, a research team at SDL Corporation demonstrated more than 100 W of output power in the fundamental mode from an ytterbium fibre laser, see Dominic et al. CLEO'99, Conference on Lasers and Electro Optics, CPD11-1, 1999. Despite the very high intensity in the embedded single mode core, in excess of 100 MW/cm$^2$, no damage to the fibre was observed, and the output power was only limited by the amount of light that could be launched into the fibre. Dominic et al. used 4*45 W diode packages to pump each end of the fibre, where two sources were polarization combined. For pumping the fibre with more sources and reaching larger output powers other pumping schemes are desired. Moreover, access to the signal is rendered difficult by the end-pumping scheme. This is particularly problematic in an optical amplifier configuration. Recognizing the need for a more flexible pumping scheme several groups have proposed alternatives to end pumping, such alternatives include accessing an active fibre through its side.

Valentin et al. in U.S. Pat. No. 5,999,673 disclose optical pumping of standard optical fibres from the side. Other examples include Heflinger et al. in U.S. Pat. No. 6,243,515, and Ionov et al. in U.S. Pat. No. 6,317,537 B1. Ionov et al. disclose a method and apparatus for coupling substantial optical power into a standard optical fibre from the side without encumbering ends of the fibre. However, prior art side-pumped optical fibres generally do not have an efficient coupling of pump light, e.g. of pump light from high power sources.

Recently, a new type of optical fibres comprising microstructured features has been demonstrated—see for example Broeng et al., Optical Fiber Technology, Vol. 5, pp. 305–330, 1999 or DiGiovanni et al. U.S. Pat. No. 5,907,652. In U.S. Pat. No. 5,907,652, DiGiovanni et al. discloses optical fibres comprising a microstructured outer cladding region, an inner cladding region and a central core.

Furusawa et al., in Optics Express, Vol. 9, No. 13, pp. 714–720, 2001 disclose a cladding-end-pumped microstructured fibre laser having a holey outer cladding and exhibiting a NA in the range 0.3 to 0.4. Nothing is indicated nor suggested about side-pumping a microstructured fibre.

Russell et al., WO 0142829, disclose microstructured fibres having a recess for evanescent field sensing. The recess provides physical access to the exposed core of the microstructured fibre, i.e. the core is exposed to the outside environment, thereby allowing evanescent field sensing using light propagating in a core of the microstructured fibre. However, for applications of microstructured fibres in devices, or apparatus, such as for example lasers or amplifiers, the physical access to the core causes light leakage from the core and thereby degrades amplified light signal or a lasing mode in the fibre core.

2. DISCLOSURE OF THE INVENTION

Object of the Invention

It is an object of the present invention to provide a scheme for pumping of microstructured fibre which alleviate disadvantages of prior art.

In an aspect, it is an object of the present invention to provide microstructured fibres with improved coupling efficiency.

It is a further object of the present invention to provide such a microstructured fibre with improved total power coupling.

It is another object of the present invention to provide such a microstructured fibre with no or reduced influence on mode-guiding in the core.

It is a further object of the present invention to provide such a microstructured optical fibre which exhibits a sufficiently high numerical aperture for maximizing high intensity pumping.

In another aspect, it is an object of the present invention to provide a method of producing a microstructured optical fibre having a cladding recess.

In still another aspect, it is the object of the present invention to provide a scheme for side coupling of light into such a microstructured fibre.

In still another aspect, it is the object of the present invention to provide an improved laser or amplifier.

Further objects appear from the description elsewhere.

Solution According to the Invention

In an aspect, the present invention fulfils these objects by providing a microstructured optical fibre as defined in claim 1, the microstructured optical fibre comprising: an inner cladding and an outer cladding; said outer cladding comprising elongated outer cladding features extending in a fibre axial direction, and a cladding recess extending at least partly through the outer cladding in a radial direction to the inner cladding; said cladding recess providing optical access to the inner cladding; whereby efficient coupling of pumping light into the inner cladding of the fibre can be obtained.

At fibre lengths where a cladding recess is not present, the outer cladding provides mechanical robustness to the fibre, and the outer cladding acts to confine light in the inner cladding.

In a preferred embodiment, the fibre further comprises a core being surrounded by the outer cladding whereby the core may guide a signal light, the inner cladding may guide a pump light, and the cladding recess provides an opening for coupling pump light through the outer cladding into the inner cladding.

In another preferred embodiment, the fibre further comprises a plurality of cores being surrounded by the outer cladding whereby output higher power may be obtained.

In a preferred embodiment, the inner cladding surrounds the core in the full cross-section of the fibre whereby the inner cladding acts to guide pump light that may couple to the core, and to confine signal light in the core.

In a preferred embodiment, the inner cladding surrounds the core in the full length of the fibre whereby signal light may be guided in the core without being disturbed, altered or otherwise influenced by the environment outside the fibre (other than the pump light and optionally a signal seed/probe light).

In a preferred embodiment, the plurality of cores is arranged in the inner cladding, whereby each core is surrounded by the inner cladding and signal light(s) may be unaffected by environmental factors.

In a preferred embodiment, the inner cladding is solid such that the inner cladding is substantially unaffected by collapse of holes in the outer cladding or other treatments of the outer cladding.

In a preferred embodiment, the cladding recess extends along the circumference of the fibre, whereby access to the full circumference may be obtained for in-coupling of light.

In a preferred embodiment, the cladding recess extends along the whole circumference of the fibre, whereby access to the whole circumference may be obtained for in-coupling of light.

In a preferred embodiment, the cladding recess extends only partly along the circumference of the fibre, whereby more efficient coupling of light into the inner cladding may be obtained through reflection of in-coupled light at positions along the circumference where the recess is not present.

In a preferred embodiment, the cladding recess extends along a part of the circumference of the fibre, said part being in the range of 20–80% of the circumference.

In a preferred embodiment, the cladding recess extends along a part of the circumference of the fibre, said part being in the range of 40–60% of the circumference, or about 50% of the circumference.

In a preferred embodiment, the cladding recess extends in the fibre axial direction along a part of the fibre.

In a preferred embodiment, the cladding recess extends in the fibre axial direction along a part of the fibre, said part having a length in the range of 0.2 mm–200 mm, whereby optimised coupling of light from various light feeding sources (such as an optical fibre, a lens or other means) is obtained. It preferred that the recess has a length that is comparable to the size of the feeding source. In particular, that the recess size or length is not larger than the feeding sources, such that leakage of in-coupled light is avoided at positions where the feeding source is not at the cladding recess.

In a preferred embodiment, the cladding recess extends in the fibre axial direction along a part of the fibre, said part having a length in the range of 0.5 mm–5 mm.

In a preferred embodiment, the outer cladding features are arranged in a first outer cladding region, whereby the first outer cladding can provide a high confinement of light in the inner cladding—typically in terms of having a high NA.

In a preferred embodiment, the outer cladding further comprises a second outer cladding region surrounding said first outer cladding region, whereby the second outer cladding may provide mechanical robustness of the fibre.

In a preferred embodiment, the second outer cladding region is solid, whereby the second outer cladding may provide a high degree of mechanical robustness of the fibre.

In a preferred embodiment, the outer cladding features are holey features, whereby for example the NA of the fibre may be controlled.

In a preferred embodiment, the cladding recess has been formed by a process, in which a part of the outer cladding features are collapsed along a length of the fibre, whereby optical access to the inner cladding is provided without using mechanical means that may damage the fibre. Also, this provides a simple-to-fabricate and potentially cheaper and faster method of producing optical fibres that may be pumped from the side. Also, the collapse of cladding features may provide a transparent window of homogeneous material—thereby providing highly effective coupling of light through the window (reflections from materials of different type and refractive indices are eliminated).

In a preferred embodiment, the circumferential extension of the collapsed part of the outer cladding features corresponds to the circumferential extension of the cladding recess.

In a preferred embodiment, the collapsed part of the outer cladding features corresponds to the area of the cladding recess.

In a preferred embodiment, the cladding recess has been formed by a process, in which a part of the outer cladding has been removed.

In a preferred embodiment, the circumferential extension of the removed part of the outer cladding corresponds to the circumferential extension of the cladding recess.

In a preferred embodiment, the removed part of the outer cladding corresponds to the area of the cladding recess.

In a preferred embodiment, the cladding recess has been formed by a process, in which the outer cladding has been removed in a sectional area smaller than the area of the cladding recess.

In a preferred embodiment, the fibre comprises a protective coating surrounding the outer cladding, and wherein a part of the protective coating has been removed, said removed part of the protective coating being larger than or corresponding to the area of the cladding recess.

In a preferred embodiment, a part of or all of the outer cladding features has a lower refractive index than any material surrounding said cladding features.

In a preferred embodiment, the cladding features are distributed around or on all sides of the core or the plurality of cores.

In a preferred embodiment, for a plurality of said outer cladding features arranged in the first outer cladding region, referred to as first outer cladding features, the minimum distance between two nearest neighbouring first outer cladding features is smaller than 1.0 μm, such as smaller than 0.75 μm, such as smaller than 0.60 μm, or such as smaller than 0.5 μm, or smaller than an optical wavelength of light guided through the fibre when in use.

In a preferred embodiment, for a plurality of said outer cladding features arranged in the first outer cladding region, referred to as first outer cladding features, the minimum distance between two nearest neighbouring first outer cladding features is smaller than an optical wavelength of light $\lambda_0$ guided through the fibre when in use.

In a preferred embodiment, for a plurality of said outer cladding features arranged in the first outer cladding region, referred to as first outer cladding features, the minimum distance between two nearest neighbouring first outer cladding features is smaller than 0.75 times, such as 0.67 times or such as 0.5 times the optical wavelength of light $\lambda_0$ guided through the fibre when in use.

In a preferred embodiment, the cladding features are air holes of a diameter in the range of 5–7 μm being placed in a close packed arrangement with a pitch between neighbouring cladding features in the range of 10–15 μm, and the fibre comprises a single core with a diameter in the range of 15–25 μm.

In a preferred embodiment, the cladding features are arranged in a silica background material and the core is a silica core.

In a preferred embodiment, the cladding features are arranged in a pure silica background material and the core is a pure silica core.

In a preferred embodiment, the core or cores comprises or comprise one or more rare-earth materials.

In a preferred embodiment, the one or more rare-earth materials is/are selected from the group of materials comprising: Er, Yb, Nd, Tm, Er/Yb.

In a preferred embodiment, the core or cores comprises or comprise a photo-sensitive material.

In a preferred embodiment, the photo-sensitive material is germanium or boron-germanium or tin.

In a preferred embodiment, the core(s) comprises or is made of silica.

In a preferred embodiment, the outer cladding features of the first outer cladding region is arranged in a first background material made of a material having a softening temperature lower than the softening temperature of the background material of the core or material of the core itself.

In a preferred embodiment, the outer cladding features of the first outer cladding region is arranged in a first background material made of a material having a softening temperature lower than the softening temperature of the background material of the inner cladding.

In a preferred embodiment, the second outer cladding region comprises a second background material made of a material having a softening temperature being lower than the softening temperature of the background material of the core or material of the core itself.

In a preferred embodiment, the second outer cladding region comprises a second background material made of a material having a softening temperature being lower than the softening temperature of the background material of the inner cladding.

In a preferred embodiment, the softening temperature of the first background material or the second background material is at least 3% or at least 5% lower than the softening temperature of the background material of the core or material of the core itself.

In a preferred embodiment, the softening temperature of the first background material or the second background material is at least 3% or at least 5% lower than the softening temperature of the background material of the inner cladding.

In a preferred embodiment, the first background material comprises or is made of fluorine- or germanium-doped silica.

In a preferred embodiment, the second background material comprises or is made of fluorine- or germanium-doped silica.

In a preferred embodiment, a radial portion or a side portion of the first outer cladding region comprises a background material having a softening temperature being lower than the softening temperature of the background material of the remaining portion(s) of the first outer cladding region.

In a preferred embodiment, a radial portion or a side portion of the second outer cladding region comprises a background material having a softening temperature being lower than softening temperature of the background material of the remaining portion(s) of the second outer cladding region.

In a preferred embodiment, said radial portion or side portion of the first outer cladding region or the second outer cladding region comprises or is made of fluorine- or germanium-doped silica.

In a preferred embodiment, the difference in softening temperature is at least 3% or at least 5%.

In a preferred embodiment, the softening temperature is defined as the temperature where the viscosity of the material is around or equal to 107.6 dPa.sec (decaPascal.second).

In a preferred embodiment, the optical fibre comprises several cladding recesses providing optical access through the outer cladding.

In a preferred embodiment, the optical fibre comprises a tapered region, such that one or more higher-order modes in the core are suppressed.

In another aspect, the present invention provides a method of producing an optical fibre with a cladding recess according to the invention, the method comprising a step of removing a part of the outer cladding by dipping a part of the fibre in an acid solution.

In a preferred embodiment, the acid solution contains HF.

In still another aspect, the present invention provides a method producing an optical fibre with a cladding recess according to the invention, the method comprising a step of removing a part of the outer cladding by use of an etching gas.

In a preferred embodiment, the etching gas is a fluorinated or a chlorinated gas such as $SF_6$, $C_2F_6$, $CCl_2F_2$ or $Cl_2$ (Chlor).

In still another aspect, the present invention provides a method producing an optical fibre with a cladding recess according to the invention, the method comprising a step of removing a part of the outer cladding by a process of polishing a side part of the fibre.

In still another aspect, the present invention provides a method producing an optical fibre with a cladding recess according to the invention, the method comprising a step of removing a part of the outer cladding by use of a heat source for evaporation of a part of the outer cladding.

In another aspect, the present invention provides a method producing an optical fibre with a cladding recess according to the invention, the method comprising a step of collapsing a part of the outer cladding features by use of a heat source.

In a preferred embodiment, the heat source includes a flame.

In a preferred embodiment, the heat source includes a laser.

In a preferred embodiment, the laser includes a $CO_2$ laser.

In a preferred embodiment, the heat source includes a resistive filament.

In still another aspect the present invention provides an apparatus comprising a length of such a microstructured optical fibre with a cladding recess according to the invention, and coupling means affixed to or secured to a part of the fibre being uncovered by said cladding recess, said coupling means thereby being positioned for coupling light into the optical fibre via said cladding recess.

In a preferred embodiment, the coupling means comprises a prism.

In a preferred embodiment, the coupling means comprises a wedge.

In still another aspect the present invention provides an apparatus comprising a length of a microstructured optical fibre with a cladding recess selected from the fibres according to the invention, wherein a groove or a series of grooves forming a grating are written in a part of the fibre being uncovered by said cladding recess.

In still another aspect the present invention provides an apparatus comprising a length of a first microstructured optical fibre with a first cladding recess selected from the fibres according to the invention, wherein a first light coupling optical fibre is affixed or secured to a first part of the first microstructured fibre being uncovered by said first cladding recess, said first light coupling optical fibre thereby being brought into optical contact with the first microstructured optical fibre via said first cladding recess.

In a preferred embodiment, the length of the first microstructured optical fibre further has a second cladding recess, and wherein a second light coupling optical fibre is affixed or secured to a second part of the first fibre being uncovered by said second cladding recess, said second light coupling optical fibre thereby being brought into optical contact with the first optical fibre via said second cladding recess.

In a preferred embodiment, light is coupled into the first and/or second light coupling fibres and guided for being coupled into the first microstructured optical fibre.

In a preferred embodiment, the first and/or second light coupling optical fibre is a multimode fibre.

In a preferred embodiment, the first and/or second light coupling optical fibre is a microstructured optical fibre having a core and an outer cladding surrounding the core, said outer cladding comprising elongate outer cladding features extending in a fibre axial direction.

In a preferred embodiment, for said first and/or second light coupling optical fibre, at least a part of the outer cladding features has been removed or collapsed in a recess part of the light coupling optical fibre being affixed or secured to the first microstructured optical fibre, so that optical contact from the first and/or second light coupling optical fibre to the first microstructured optical fibre is provided via the recess part of the first and/or second light coupling optical fibre and the first cladding recess and/or the second cladding recess of the first microstructured optical fibre.

In a preferred embodiment, the first and/or second light coupling optical fibre is a microstructured optical fibre with a cladding recess selected from fibres according to the invention.

In a preferred embodiment, an end part of the first and/or second light coupling optical fibre is affixed or secured to the part of the first fibre being uncovered by said first cladding recess.

In a preferred embodiment, said end part is angle polished.

In a preferred embodiment, said end part is angle tapered.

In a preferred embodiment, the light coupling optical fibre(s) is affixed or secured to the first fibre by use of a transparent resin.

In a preferred embodiment, the light coupling optical fibre(s) is affixed or secured to the first fibre by fusion.

In another aspect, the present invention provides an apparatus comprising a length of a microstructured fibre with cladding recess according to the invention wherein said apparatus is a laser and/or amplifier.

In another aspect, the present invention provides an apparatus comprising a length of a microstructured fibre with cladding recess according to the invention wherein said optical fibre comprises at least two cladding recesses.

In a preferred embodiment, said length of a microstructured optical fibre is adapted to be pumped from one or more ends of the microstructured optical fibre.

In another preferred embodiment, said apparatus comprises at least one pump feeding element at each cladding recess.

In another preferred embodiment, a first and a second neighbouring cladding recesses are adapted to couple pump light to said inner cladding so that the first of said neighbouring cladding recesses results in absorption of more than 50%, preferably more than 90% of the pump light coupled to said inner cladding by said first and second neighbouring cladding recesses; said absorption predominantly being absorption in the core of the optical fibre.

It is to be understood that the following detailed description and accompanying drawings further describe principles and operation of exemplary embodiments of the invention, and that the invention is not intended to be limited thereto.

3. BRIEF DESCRIPTION OF THE DRAWINGS

In the following, by way of examples only, the invention is further disclosed with detailed description of preferred embodiments. Reference is made to the drawings in which FIG. 1a shows a schematic illustration of a longitudinal section of a microstructured fibre with cladding recess made by removing a portion of the outer cladding; and FIG. 1b shows a schematic illustration of a longitudinal section of a microstructured fibre with cladding recess made by collapsing some outer cladding holes.

FIG. 2a shows a schematic illustration of a cross section of a microstructured fibre with cladding recess made by removing a section of the outer cladding; and FIG. 2b shows a schematic illustration of a cross section of a microstructured fibre with cladding recess made by collapsing some outer cladding holes.

FIG. 3a shows a picture from the side of a microstructured fibre with a cladding recess made by collapsing all the outer cladding holes;

FIG. 3b shows a picture of a cleaved section of the microstructured fibre shown in FIG. 3a in the cladding recess region (collapsed holes); and FIG. 3c shows a picture of a cleaved section of the microstructured fibre shown in FIG. 3a outside the cladding recess region (unprocessed).

FIG. 4 shows schematic example of microstructured fibres to be used in this invention (schematic illustrations of cross-sections):

FIG. 4a shows a microstructured fibre with an active core embedded in the inner cladding;

FIG. 4b shows a microstructured fibre with several cores embedded in the inner cladding;

FIG. 4c shows a microstructured fibre with microstructured inner cladding; and

FIG. 4d shows a rectangular microstructured fibre with one side of the outer cladding made of a softer background material.

FIG. 8 shows examples of application of fibre coupler on cladding recess in:

4. DETAILED DESCRIPTION

"Microstructures Optical Fibre"

Figure 5A:
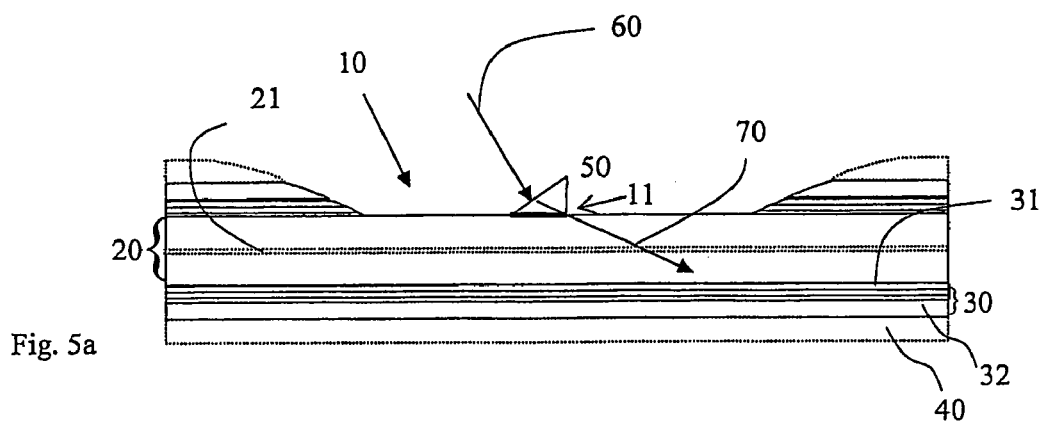
FIG. 5a shows an arrangement for coupling light into a microstructured fibre through a cladding recess using a wedge or a prism affixed to the cladding recess.

FIG. 1 shows a schematic, longitudinal view of an example of a preferred embodiment of a microstructured fibre according to the present invention, the microstructured fibre comprising a cladding recess. FIG. 2 shows a schematic, cross-sectional view of the microstructured fibre shown in FIG. 1.

The microstructured fibre comprises an inner cladding 20, and an outer cladding 30 around the inner cladding. The outer cladding comprises a first outer cladding region 31 having elongated features extending along the fibre axis. The outer cladding region optionally comprises a further second outer cladding region 32, e.g. in a solid form. The elongated features in the outer cladding allow guiding in the inner cladding 20 either by modified total internal reflection or by the photonic band gap effect. A coating, usually made of a polymer, surrounds the outer cladding to protect the fibre mechanically. This coating is typically stripped in the vicinity of the cladding recess and therefore omitted in all the figures. In the cladding pumped configuration an embedded core 21 may be present within the inner cladding 20. In this case the inner cladding 20 operates as a region wherein pumping light can be coupled to. If it is desired, the cladding recess can be designed to provide optical access to other parts of the cladding, e.g. the inner cladding, the outer cladding, or both.

The present invention covers preferred embodiments, wherein the cladding recess 10 creates a side window allowing coupling in or out of the inner cladding from the side of the fibre. In another embodiment, the side-window is extended in the full length of the microstructured fibre. While fabricating the recess, a transmission measurement can be carried out to check whether coupling has been achieved. Light can be launched at one end of the fibre in the inner cladding 20 and detected at the other end. When the transmitted power drops, this indicates that the recess 10 is now effective for optical coupling.

"Method of Preparation"

In FIGS. 1a and 2a, the cladding recess 10 is made by removing the outer cladding 30 to give direct access to the inner cladding 20 (note that a section of the inner cladding 20 can also be partially removed as shown in these figures). This method is applicable to fibres wherein the elongated features of the microstructured outer cladding 31 are made of, or constituted by, a gas, or of a solid material. The removal of the outer cladding can be carried out by several techniques. Polishing is a well-established technique. The section of the fibre to be processed is placed on a polishing jig pressing the sample on a moving plate containing an abrasive powder, such as alumina, diamond, or zirconium powder. The powder grain size and the pressure applied by the jig give fine control on the thickness removed. Etching is an alternative to polishing. Etching can be carried out by dipping the side of the fibre in an acidic solution. A solution containing hydrofluoric acid is particularly effective when dealing with silica fibres. The etching process can also rely on a gas, rather than a solution. Here the segment of the microstructured fibre wherein the recess is to be formed is introduced into a chamber containing the etching gas, typically containing chlorine or fluorine. The etching rate is controlled by the concentration of the gas and by the temperature in the chamber. In the plasma etching technique, a well-established technique within the microelectronics industry and known to be effective to remove silica, the power of the plasma gives fine control on the etching rate. Yet another technique consists in evaporating the outer cladding on a portion of the fibre by exposing it to a localized heat source, such as a focused laser beam, a resistive filament, or an electrical arc. To accelerate the evaporation it may be preferred to place the sample in a vacuum chamber while heating. A laser is a well-suited heat source because of its ability to concentrate power in space and time. The vast majority of materials used to produce optical fibres, and in particular silica, strongly absorb radiations at a wavelength of around 10 μm. A $CO_2$ laser beam may be a versatile heat source to produce a recess by evaporation. A preferred method is to orient the focussed beam tangentially to the fibre and translate the fibre along its axis over the length desired for the recess. Similarly we can leave the fibre still and translate the beam across its length. This is conveniently achieved using a moving mirror. A filament made of a high melting point metal with a large electrical resistivity, such as tungsten, is also a suitable heat source. The shape of the filament (e.g. straight or Ω shaped), the position of the fibre respective to the filament, and the current thought the filament determine the temperature gradient in the fibre and therefore the profile of the evaporated surface.

When the microstructures of the outer cladding consist of elongated features made of, or constituted by, either vacuum or gas, such as air, another method may be applicable. The recess may be made by collapsing the hollow features of the microstructured outer cladding 31 on the inner cladding 20, as illustrated in FIG. 1b and FIG. 2b. The guiding in the inner cladding is disrupted due to the collapse of a section of the guiding hollow features, and the inner cladding is optically accessible from the collapsed solid outer cladding forming the recess. Laser or other heat sources, as described above, may also be used to collapse the holes/voids.

With both methods, i.e. removal or collapse of outer cladding, the recess can extend along a part of the circumference of the fibre as shown in FIGS. 1 and 2, or all around the fibre as shown in FIG. 3. The recess is intended to provide optical interaction with the outside over a short extend. Typically it will extend over a few hundred micrometers to a few millimetres. If the interaction is required to be over a very short length the recess can be made a short as a few tens of micrometers long. On the other hand, if for example several apparatus need to be affixed to the recess, if can be made to extend over a few centimetres. FIG. 3 shows a photograph from the side of a recess made by collapsing voids (air filled holes) of the outer cladding all along the circumference of the fibre. Here, a commercially available fibre splicer—trademark Vytran FFS 2000—was used. The fibre was placed in the centre of the Ω-shaped resistive filament. During heating, the filament was surrounded with Ar gas and was moved along the axis of the fibre.

The extent of the travel determined the length of the recess, which in this example was 180 μm. To primarily melt the outer parts of the fibre, a short, intense heat treatment was chosen. In this example, the heating power was 30 W and the duration was less than a second. Photographs of cleaved sections of the fibre, both outside the recess and inside the recess region are shown in FIG. 3b and FIG. 3c, respectively. The fibre was made of synthetic silica. It was 200 μm in diameter with a single circular layer of air holes forming the microstructured outer cladding. Both the microstructured outer cladding and the solid outer cladding were 14 μm thick, combining into a 28 μm thick outer cladding. The inner cladding was 142 μm in diameter. The outer cladding comprised 38 holes, separated by approximately 0.95 μm thick bridge.

The bridge width, b, is defined as the smallest distance between to voids in a cross-section of the outer cladding region.

"High NA Microstructured Optical Fibres"

In an aspect, preferred embodiments of the present invention are aimed at cladding pumped fibre lasers and fibre amplifiers. For such applications, it is typically preferred to have a high NA of the inner cladding region. In order to obtain a high NA of the fibre (here referring to the NA of the inner cladding region) at a given wavelength, $\lambda_o$ (typically $\lambda_o$ is a pumping wavelength), it is preferred that the bridge width, b, should be at least smaller than $\lambda_o$ to provide a NA of more than 0.3. For smaller b, an even higher NA may be obtained. For b smaller than 0.75 $\lambda_o$ a NA of more than 0.4 may be achieved, and for b smaller than 0.5 $\lambda_o$ a NA of more than 0.5 may be achieved. These results have been obtained through numerical simulations using the so-called MPB method as described by Johnson et al. in Optics Express 8, no. 3, pp. 173–190, 2001; the results have been confirmed by experimental work published in International Application No. PCT/DK02/00568, the content of which is incorporated herein by reference. It is further preferred that for a lower refractive index of the background material of the first outer cladding region (the refractive index of the material in the afore-mentioned bridge) compared to the background material of the inner cladding that an even higher NA may be obtained than for similar refractive indices. For example, it is preferred that for an index difference of at least 1% between the two afore-mentioned refractive indices, a NA of more than 0.5 may be realized for $\lambda_o$/b equal to or larger than 1.5. Hence for operation around 1.0 μm, b should be equal to or smaller than approximately 600 nm for providing a NA of 0.5 or more.

"Microstructured Fibre Geometries/Designs"

Many microstructured fibre geometries can be used in this invention. FIG. 4 shows some examples of embodiments. FIGS. 4a, 4b, and 4c show embodiments of cladding pumped fibres. These fibres comprise one core 21 (FIGS. 4a and 4c) or several embedded cores 21 (FIG. 4b) within the inner cladding 20. For amplifier and laser applications the embedded cores 21 are usually doped with a rare earth such as erbium, ytterbium, neodymium and/or thulium, and/or with a transition metal, such as chromium. In addition, aluminium or lanthanum is often present to reduce clustering, which leads to the detrimental concentration quenching. In a preferred embodiment, all regions of the fibre (outer cladding 30, inner cladding 20, embedded cores 21) contain more than 70 mol % silica, and common index raising dopants such as germanium or phosphorus, or common index depressing dopants such as boron or fluorine can be included in the inner cladding 20 or/and the embedded cores 21 to tailor the refractive index step between these two regions. Photosensitive dopants as such germanium, boron, or tin may also be added in the embedded cores 21 or the inner cladding 20 for the purpose of writing gratings. Although there is usually only one embedded core 21, the presence of several cores can be advantageous as demonstrated by Cheo et al., in IEEE Photonics Technology Letters, Vol. 13, No. 5, 5 May 2001. The presence of many cores increases the pump absorption while evanescent coupling permits phase locking, resulting in a tightly focusable laser beam.

In FIG. 4a a single core 21 of refractive index $n_c$. The core may have a refractive index profile (such as for example a step, a parabolic or any other imaginable profile). In the case of a non-uniform profile (the step profile for example being uniform), $n_c$ should be taken as the core index of an equivalent step-index fibre that have the same core spot-size at an operating wavelength, $\lambda_0$, as the actual fibre. The core of the microstructured fibre in FIG. 4a has of diameter d and the core is surrounded by a solid inner cladding 20 of index $n_i$. Ensuring single-mode guidance in the core is often desirable. This is advantageous because the beam spreading is then diffraction limited and inter-modal dispersion does not occur. The condition for single-mode propagation in a circular core (circular being in the cross-section of the fibre) at a wavelength $\lambda$ is that the V-value of the core-inner cladding guide given by $V=\pi \cdot d \cdot (n_c^2-n_i^2)^{1/2}/\lambda$ should not exceed 2.405. For example, at a wavelength of 1 μm, for a typical index differences $n_c-n_i$ of $2.10^{-3}$ to $2.10^{-2}$, the core diameter should be in the range 3 μm to 10 μm.

For retaining single-mode operation while having a large core size, it is particularly interesting to reduce the device length because, in a first approximation, the pump absorption is proportional to the core to inner-cladding area ratio. Furthermore, non-linear effects are rapidly reduced with increasing core size, since they depend on the intensity, which is inversely proportional to the core area. By using a microstructure in the cladding, it is possible to have single mode operation (and limited bending loss) with larger core sizes than it would be possible in conventional fibres. For example, a microstructured fibre having an inner cladding comprising air holes of diameter 6.2 μm arranged in a close-packed arrangement with a pitch of 13.4 μm in a pure silica matrix, and having a centre of a pure silica core of 20 μm in diameter, has been produced. This fibre supports a well-guided single mode over a wide wavelength range of at least $\lambda_0$ from 0.8 μm to 1.8 μm. This microstructure is referred to as "endlessly single mode", in the literature. Other microstructure patterns of the inner cladding can be designed. For instance, in order to manipulate dispersion and/or to enhance non-linear effects in the core. It is well known to people skilled in the art that the propagation properties can be tailored with more flexibility in microstructured fibres than in conventional fibres. A cross-section of an embodiment of the double clad fibre with a microstructured inner cladding is shown in FIG. 4c. The inner cladding 20 comprises an array of elongated features 22. In FIG. 4c the microstructure is present in the entire inner cladding but fibres with an inner cladding comprising both microstructured region(s) and homogeneous region(s) are also possible. To maintain the propagation properties of the core 21 the elongated features 22 should not be significantly altered when fabricating the outer cladding recess. This may be critical when both the inner and the outer cladding comprise voids and when the recess is processed with a heat source as described above. In preferred embodiments, however, the bridges between voids are made much thinner in the outer cladding (typically around 0.7 μm or less) than in the inner cladding (typically around 5 μm or more) to provide a high numerical aperture in the inner cladding 20—the width of the bridges having already being discussed. By controlling the amount of heat used to form the recess and its spatial distribution, the outer cladding holes may collapse to form a recess while the inner voids 22 are substantially unaffected—or at least the innermost voids are substantially unaffected. This control may be simple with a laser but may be more difficult when using a filament or an electric arc as the heat source. In these cases it is advantageous to make the inner cladding less sensitive to the heat processing than the outer cladding. This can be achieved by adding some softening dopants in the outer cladding. By softening is meant that the viscosity of the outer cladding is lower (typically by one or two orders of magnitude) than that of the inner cladding at the processing temperature. For instance, if the inner cladding is essentially made of silica then silica doped with either phosphorus, fluorine, or germanium, or any combination of these, can be used to create a softer outer cladding. To facilitate the formation of the recess only on one side of the outer cladding 34 it is advantageous to introduce softening dopants only on the side of the outer cladding while leaving the rest of the outer cladding 33 not doped (or less doped), as illustrated in FIG. 4d. In this figure the inner cladding 20 has a rectangular shape and it is indeed often advantageous to have a non-circular inner cladding to favour mode mixing or to fit the beam profile of the pumping source. The inner cladding area 20 is usually in the range $10^{-4}$ mm² to 1 mm². In a cladding pumped configuration, it is typically 100 to 1000 times larger than the area of the laser active embedded core 21.

In other preferred embodiments, the core comprises material with a higher refractive index than a background material of the inner cladding. In this case the core will retain its ability to confine light—even the case where a cladding recess is made where both holes in the outer and in the inner cladding regions are collapsed. Thereby, several cladding recesses may be used to coupled pump light into the inner cladding, and the signal light remains unaffected by the cladding recess. In this manner, a high power signal light may be built up using multiple (for example more than three) side recess regions.

Figure 5B:
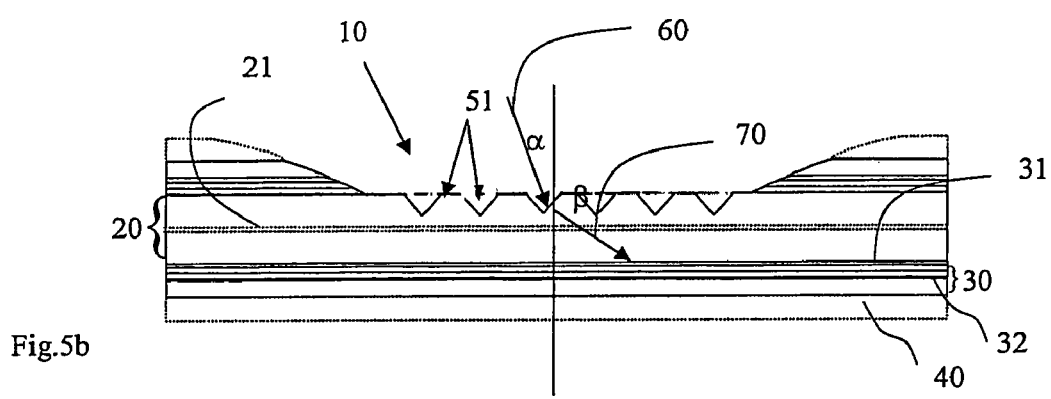
FIG. 5b shows an arrangement for coupling light into a microstructured fibre through a cladding recess using a grating on the surface of the cladding recess.
Figure 5C:
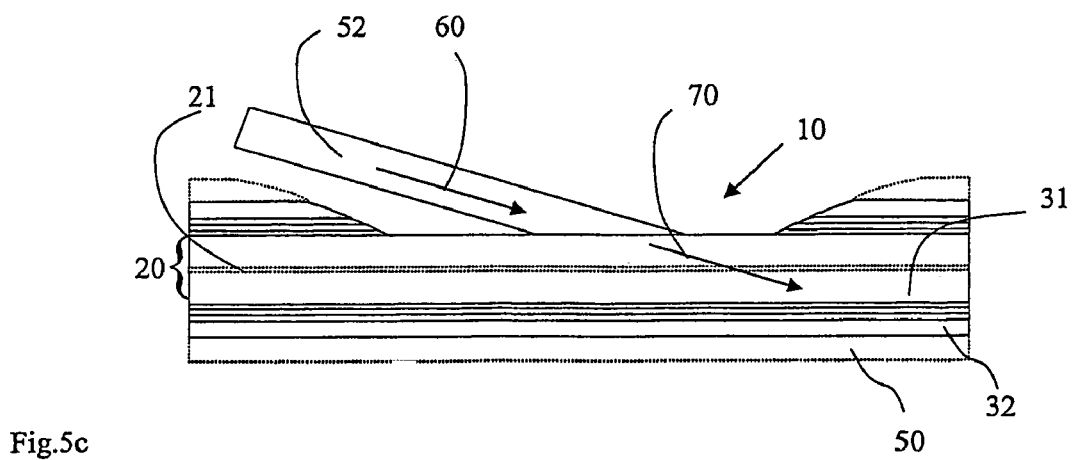
FIG. 5c shows an arrangement for coupling light into a microstructured fibre through a cladding recess using a feeding fibre affixed to the cladding recess.

FIG. 5 shows three preferred embodiments for using a cladding recess in a microstructured fibre for coupling light into an inner cladding region. Three methods are schematically illustrated in FIGS. 5a–5c. In the first method, illustrated in FIG. 5a, a prism or a wedge 50 is placed on the surface of the recess 10. Oil, or alternatively optical glue or a cementing glass 11 of refractive index equal to or higher than the refractive index of the inner cladding 20 is preferably used between the wedge and the recess to obtain good optical contact. For a given angle of incidence on the wedge 50 of the incoming beam 60, the coupled beam 70 will be directed within the acceptance angle of the inner cladding 20 that acts as a multimode waveguide.

FIG. 5b shows a length of air clad-fibre with a cladding recess 10 in which, or onto which, a grating 51 is formed by a periodic reflective index modulation. The index modulation may be obtained by deposition of a metallic or dielectric structure, by a UV-induced change of the reflective index, or by physically removing the glass so that an array of grooves is formed. The diffraction order, m, and the diffraction angle, β, are related to the angle of the incident light, α, the period of the grating, d, the index of the inner cladding glass, $n_i$, and the wavelength of the light, λ, by the grating equation:

$$m\lambda = d(\sin \alpha + n_i \sin \beta)$$

E.g. for λ=1550 nm, $n_i$=1.45, m=−1 and d=1.3 μm light incident in the angular range α=−10 to 10 degrees is diffracted into the angles β=45–70 degrees. This range of diffraction angles will experience total internal reflection (TIR) in the inner cladding, assuming the index of the outer cladding to be 1. In general, the minimum diffraction angle, βmin, that will experience TIR in the inner cladding is given by $n_i \sin(\beta_{min}) = n_o$, where $n_1$ and $n_o$ are the refractive indices of the inner and outer cladding respectively. The grating may be blazed to enhance the m'th order of diffraction. If d is the diameter of the inner cladding, the full length of the grating should be on the order of 2d tan(β min) or shorter to avoid the light coupled into the fibre from reaching the grating again. The large NA achievable in a fibre with outer cladding microstructures makes it possible to guide the in-coupled diffracted beam 70 over a large angular range.

Figure 6A:
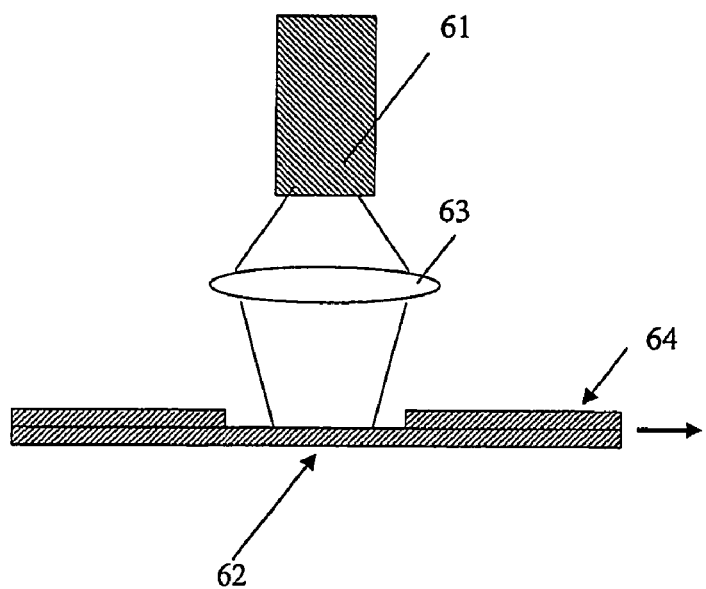
FIG. 6a shows an example of coupling scheme for cladding recess with grating using a lens. The divergence of the light emerging from the light source is adjusted to the acceptance angle of the grating, using a lens.
Figure 6B:
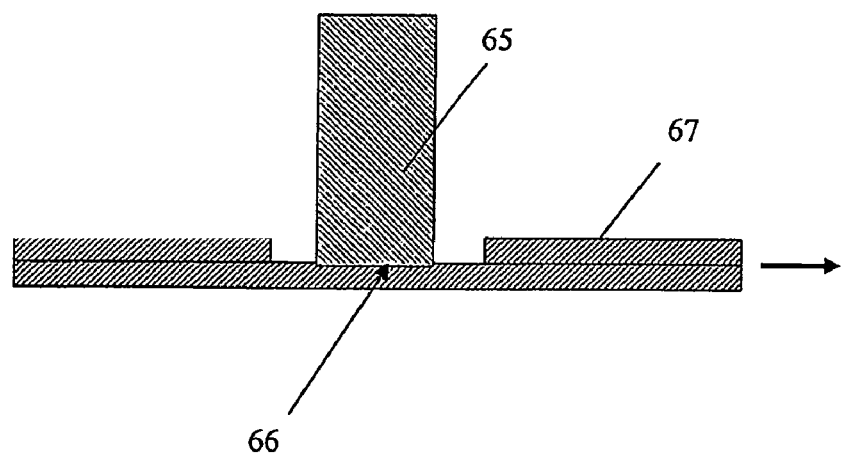
FIG. 6b shows an example of coupling scheme for cladding recess with grating using butt coupling. The output of a laser diode is placed in contact with or in the proximity of the grating, so the elliptical mode of the laser diode is oriented with the largest main axis parallel to the fibre.

FIG. 6a shows schematically how a beam from a light source 61 can be coupled into a fibre 64 according to a preferred embodiment by focussing the beam onto the grating 62 with a lens 63 or a series of lenses. The scheme is versatile in that it allows for adjusting the divergence of the emerging beam. It can be used with a large range of light sources. Diode stripes or a series of integrated diode stripes, which may form so-called diode bars, may be a preferred light source because of their compactness, high efficiency, and high output power. Commercially available diode stripes have a rectangular emitting surface only around 1 μm wide and a few 100 μm long, and are capable of delivering several watts of optical power. A cylindrical lens is usually integrated with the diode stripe to collimate the light in the fast axis. Placing a diode stripe 65 in front of a grating 66 written in a fibre recess while aligning a long axis of a diode stripe with a longitudinal axis of the fibre 67 allow for direct coupling of light into the fibre (FIG. 6*b*). This arrangement may be less sensitive to misalignment than the arrangement shown in FIG. 6*a* and can be packaged very compactly.

FIG. 5*c* shows another example of a coupling scheme where a feeding fibre 52 is used to direct light from a light source 60 transversely into the fed fibre 70. Light is coupled to one end of the fed fibre, while the other end is placed in optical contact with a cladding recess formed on the side of the fed fibre. The feeding fibre may for example be a tapered or angled polished in the region of contact with the cladding recess of the fed fibre. The two fibres may be attached by means of optical glue or by fusion.

Figure 7:
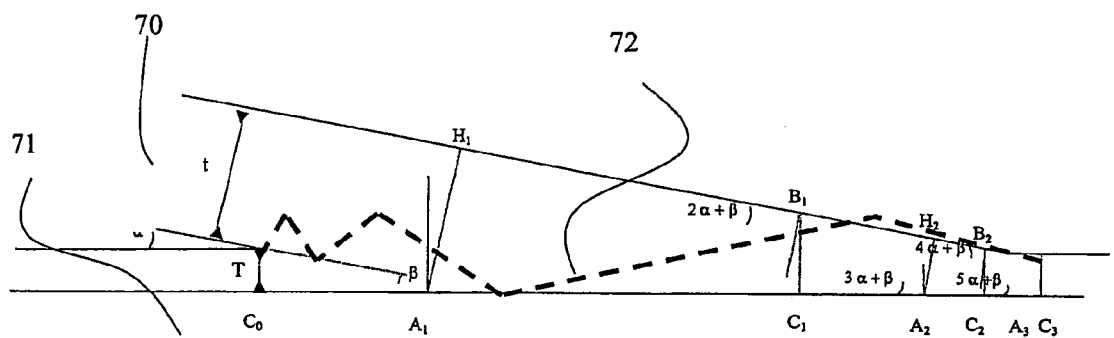
FIG. 7 shows a ray path from the feeding fibre to the fed fibre through the cladding recess coupling region (arrangement shown in FIG. 5c)

FIG. 7 shows a light path 72 of a beam of divergence β through a coupling region while the two fibres of FIG. 5*c* are at an angle α. The feeding fibre is denoted 70 and the inner cladding of the fibre comprising a cladding recess is denoted 71. To obtain lossless coupling, using the notations of FIG. 7, there should exist an integer number n so that:

$$\begin{cases} C_0 C_n > \dfrac{t}{\sin \alpha} & [C1] \\ (2n-1)\alpha + \beta > \dfrac{\pi}{2} - \text{ArcSin}\!\left(\dfrac{n_o}{n_i}\right) & [C2] \end{cases}$$

The first condition [C1] corresponds to the beam exiting the coupling region while the second condition [C2] stipulates that the exiting beam should remain below a critical angle value. The value of this critical angle increases with the decreasing value of the effective index ratio between the outer cladding and the inner cladding: $n_o/n_i$. Therefore, the low value of $n_o$ achievable in a microstructured outer cladding allows for higher values of α and β than is possible with conventional fibres. Due to the microstructure in the outer cladding (or in the first outer cladding region if the fibre comprises a solid second outer cladding region), $n_o$ may be considered as an effective refractive index of the outer cladding (first outer cladding region) at the operating wavelength. The effective index of a microstructure at a given wavelength may for example be determined using the aforementioned MPB method.

It is preferred that the feeding fibre 70 has a different refractive index than a background material of the inner cladding. From considerations based on Snells law, this allows to control the reflection angles of the beam 72 at positions $A_1, A_2, \ldots A_n$, and/or at positions $B_1, B_2, \ldots B_n$ (see FIG. 7). This may, for example, be utilized to reduce the amount of power that is coupled out at these positions by providing more grazing angles, thereby increasing the amount of power coupled into the inner cladding over the cladding recess region. In a preferred embodiment, the feeding fibre 70 has a higher refractive index than a background material of the inner cladding to provide more grazing angles at positions $A_1, A_2, \ldots A_n$. This case may, for example, be preferred if the cladding recess is defined as in FIG. 3, such as to provide a light beam with grazing incident angles at positions $A_1, A_2, \ldots A_n$ in order to maintain total internal reflection at these positions. In an alternative embodiment, the feeding fibre 70 has a lower refractive index than a background material of the inner cladding. This latter case may, for example, be preferred if the cladding recess is defined as in FIG. 2*a* or FIG. 2*b*, such that a light beam at positions $A_1, A_2, \ldots A_n$ experiences a high NA (and are, therefore, reflected even at sharp (non-grazing angles)), while it is desired to reduce the sharpness of the incident angles at positions $B_1, B_2, \ldots B_n$.

Figure 8A:
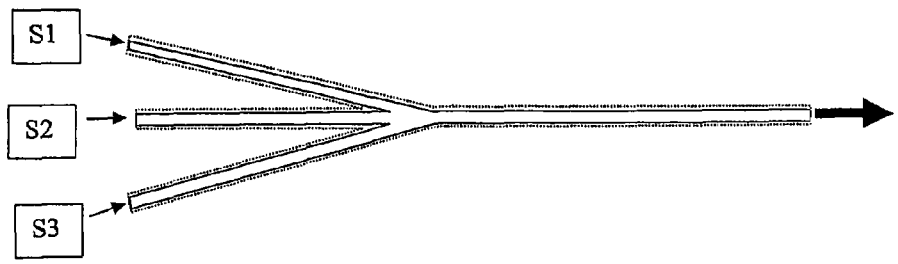
FIG. 8a shows a pump combiner.
Figure 8B:
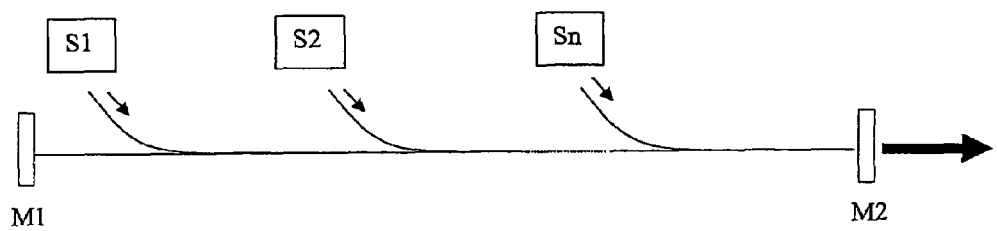
FIG. 8b shows a fibre laser.
Figure 8C:
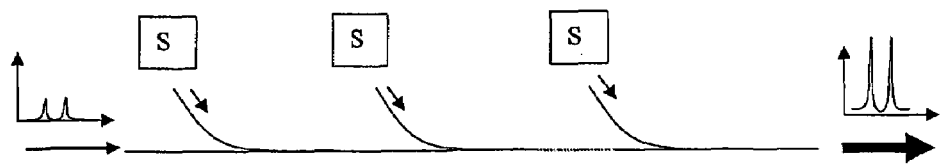
FIG. 8c shows an optical fibre amplifier.

FIGS. 8*a*, 8*b*, and 8*c* show examples of embodiments of devices according to the present invention that make use of fibre coupling through a cladding recess in a microstructured fibre. FIG. 8*a* illustrates a device combining the output of three sources into a single fibre. The central fibre has a cladding recess to which two fibres are affixed in a similar manner as described in FIG. 5*c*. The two side-fibres, S1 and S3 may not necessarily include a microstructured outer cladding but this may be preferred in order to obtain a large NA needed to avoid leakage in the coupling region where the beam divergence is increased. There may, of course, be more than three beams combined. For instance, six circular fibres could be affixed around the cladding recess of the central fibre to form a hexagonal junction. Note that following the principle of reciprocity such an arrangement can also serve as a beam splitter.

FIG. 8*b* shows a schematic example of a fibre laser configuration according to a preferred embodiment of the present invention. The central fibre has a cladding pumped structure similar to FIG. 5*a*. The mirrors M1, M2 used to form the cavity may for example be discrete mirrors, dielectric stacks directly deposited on the fibre ends or spliced to them, or Bragg gratings written in an active core or in a region surrounding the active core (i.e. a photo-refractive ring). Often one of the two mirrors may be omitted since the gain may usually be high enough to allow lasing from Fresnel reflection. Avoiding reflections and launching a signal at one end a fibre amplifier may also be constructed, as illustrated in FIG. 8*c*. The power of these devices can be scaled up by increasing the number of coupling arrangements per cladding recess, or by increasing the number of recesses with coupling arrangement along the double clad fibre. When the coupling arrangements significantly increase the pump beam divergence it is desirable to space the coupling arrangements far enough for the pump to be essentially absorbed between two consecutive coupling arrangements. As an example, a silica based erbium/ytterbium doped cladding pumped fibre with a design as schematically shown in FIG. 5*a* may have a phosphosilicate core being around 5 µm in diameter and comprising around 1 mol % ytterbium ions and around 0.1 mol % erbium ions. The fibre may further be characterized by an inner cladding being around 100 µm in diameter. In this fibre more than 10 dB pump absorption may be achieved in less than five meters for pump wavelength(s) in the range around 920–980 nm. Using a similar fibre doped with several 1000 ppm neodymium ions, a 10 dB absorption length of a few meters for source around 805 nm can also be obtained. For a fibre, which is a few tens of meters long, it may be practical to launch more than ten pump sources through several cladding recesses. This may offer a solution to scale up the power for fibre lasers and amplifiers to the kW level.

Figure 9:
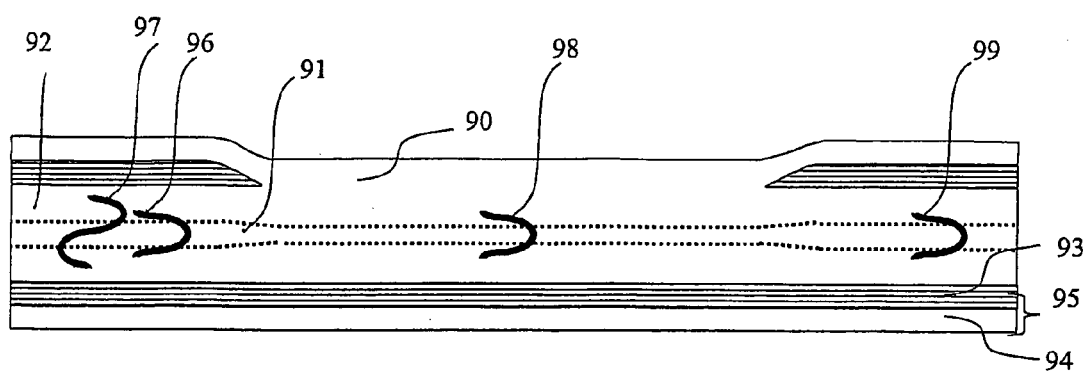
FIG. 9 is a schematic illustration of the longitudinal section of a fibre with cladding recess and a tapered core region.

Especially for high power fibre lasers and/or amplifiers, the present inventors have realized that it may be preferred to design the optical fibre such that it, in theory, supports at least one higher order modes apart from a fundamental mode, and use a mode filter incorporated at one or more positions along the fibre to suppress the higher-order mode(s). The present invention includes preferred embodiments as schematically shown in FIG. 9. The fibre in FIG. 9 comprises a core 91, a cladding recess 90, an inner cladding 92, a first outer cladding 93 comprising microstructured features, and a solid second outer cladding 94. The first and second outer cladding forms an outer cladding 95. The fibre may further be characterized in that the core in a longitudinal direction has been tapered such that a higher order mode 97 is stripped off in the tapered region 91 and the fibre effectively acts as a mode filter—only allowing the fundamental mode 96, 98, 99 to be guided through the full length of the fibre. In this manner, it is possible to build up a high power, single-mode, and signal light in the core even in the case of the fibre supporting a higher-order mode over a part of its longitudinal direction. For a cladding recess obtained by collapsing holes in the outer cladding using splice machine, Vytran FFS 2000, the taper may fabricated at the same time as collapsing the holes by stretching the optical fibre. The Vytran FFS 2000 has a large degree of flexibility in adjusting temperature, stretching (and even pushing), and other parameters—and a person skilled in use of splicing equipment would be able through iterative use to determine useful parameters for obtaining fibres according to the various preferred embodiments of the present invention.

Various methods for realizing cladding recess have been described previously. The methods may be applied for example to commercially available microstructured fibres. Optical fibres comprising microstructured features may be made in a number of manners, including well known technique that is based in on stacking of capillary tubes and rods to form a preform and drawing this into fibre using a conventional drawing tower. This method has been described in international literature for example by Birks et al. "2D Photonic Band Gap Structures in Fibre Form", published in "Photonic Band Gap Materials", Kluwer (1996), and by DiGiovanni et al, in U.S. Pat. No. 5,907,652 and U.S. Pat. No. 5,802,236, the contents of which are incorporated herein by reference.

The invention claimed is:

1. A microstructured optical fibre comprising an inner cladding and an outer cladding; said outer cladding comprising elongated outer cladding features extending in an axial direction of the fibre, wherein said elongated outer cladding features are at least partially removed over a length of the fibre in said axial direction thereby forming at least one cladding recess extending at least partly through the outer cladding in a radial direction to the inner cladding; said cladding recess providing optical access to the inner cladding.

2. An optical fibre according to claim 1, wherein the fibre further comprises a core being surrounded by the outer cladding.

3. An optical fibre according to claim 1, wherein the fibre further comprises a plurality of cores being surrounded by the outer cladding.

4. An optical fibre according to claim 1, wherein the inner cladding surrounds the core.

5. An optical fibre according to claim 2, wherein the inner cladding physically surrounds the core in the full length of the fibre.

6. An optical fibre according to claim 3, wherein the plurality of cores is arranged in the inner cladding.

7. An optical fibre according to claim 4, wherein the inner cladding is solid.

8. An optical fibre according to claim 1, wherein the cladding recess extends along the circumference of the fibre.

9. An optical fibre according to claim 8, wherein the cladding recess extends along the whole circumference of the fibre.

10. An optical fibre according to claim 8, wherein the cladding recess extends only partly along the circumference of the fibre.

11. An optical fibre according to claim 10, wherein the cladding recess extends along a part of the circumference of the fibre, said part being in the range of 20–80% of the circumference.

12. An optical fibre according to claim 10, wherein the cladding recess extends along a part of the circumference of the fibre, said part being in the range of 40–60% of the circumference, or about 50% of the circumference.

13. An optical fibre according to claim 1, wherein the cladding recess extends in the fibre axial direction along a part of the fibre.

14. An optical fibre according to claim 7, wherein the cladding recess extends in the fibre axial direction along a part of the fibre, said part having a length in the range of 0.2 mm–200 mm.

15. An optical fibre according to claim 14, wherein the cladding recess extends in the fibre axial direction along a part of the fibre, said part having a length in the range of 0.5 mm–5 mm.

16. An optical fibre according to claim 1, wherein the outer cladding features are arranged in a first outer cladding region.

17. An optical fibre according to claim 16, wherein the outer cladding further comprises a second outer cladding region surrounding said first outer cladding region.

18. An optical fibre according to claim 17, wherein the second outer cladding region is solid.

19. An optical fibre according to claim 1, wherein the outer cladding features are holey features.

20. An optical fibre according to claim 19, wherein the cladding recess has been formed by a process, in which a part of the outer cladding features are collapsed along a length of the fibre whereby the corresponding part of the outer cladding is radially shrunk to provide a cladding recess in the outer surface thereof.

21. An optical fibre according to claim 20, wherein the circumferential extension of the collapsed part of the outer cladding features corresponds to the circumferential extension of the cladding recess.

22. An optical fibre according to claim 20, wherein the collapsed part of the outer cladding features corresponds to the area of the cladding recess.

23. An optical fibre according to claim 1, wherein the cladding recess has been formed by a process, in which a part of the outer cladding has been removed.

24. An optical fibre according to claim 23, wherein the circumferential extension of the removed part of the outer cladding corresponds to the circumferential extension of the cladding recess.

25. An optical fibre according to claim 23, wherein the removed part of the outer cladding corresponds to the area of the cladding recess.

26. An optical fibre according to claim 1, wherein the cladding recess has been formed by a process, in which the outer cladding has been removed in a sectional area smaller than the area of the cladding recess.

27. An optical fibre according to claim 1, wherein the fibre comprises a protective coating surrounding the outer cladding, and wherein a part of the protective coating has been removed, said removed part of the protective coating being larger than or corresponding to the area of the cladding recess.

28. An optical fibre according to claim 1, wherein a part of or all of the outer cladding features has a lower refractive index than any material surrounding said cladding features.

29. An optical fibre according to claim 2, wherein the cladding features are distributed around or on all sides of the core or the plurality of cores.

30. An optical fibre according to claim 16, wherein for a plurality of said outer cladding features arranged in the first outer cladding region, referred to as first outer cladding features, the minimum distance between two nearest neighbouring first outer cladding features is smaller than 1.0 µm, such as smaller than 0.75 µm, such as smaller than 0.60 µm, or such as smaller than 0.5 µm, or smaller than an optical wavelength of light guided through the fibre when in use.

31. An optical fibre according to claim 16, wherein for a plurality of said outer cladding features arranged in the first outer cladding region, referred to as first outer cladding features, the minimum distance between two nearest neighbouring first outer cladding features is smaller than an optical wavelength of light $\lambda_0$ guided through the fibre when in use.

32. An optical fibre according to claim 31, wherein for a plurality of said outer cladding features arranged in the first outer cladding region, referred to as first outer cladding features, the minimum distance between two nearest neighbouring first outer cladding features is smaller than 0.75 times, such as 0.67 times or such as 0.5 times the optical wavelength of light $\lambda_0$ guided through the fibre when in use.

33. An optical fibre according to claim 2, wherein the cladding features are air holes of a diameter in the range of 5–7 µm being placed in a close packed arrangement with a pitch between neighbouring cladding features in the range of 10–15 µm, and the fibre comprises a single core with a diameter in the range of 15–25 µm.

34. An optical fibre according to claim 2, wherein the cladding features are arranged in a silica background material and the core is a silica core.

35. An optical fibre according to claim 34, wherein the cladding features are arranged in a pure silica background material and the core is a pure silica core.

36. An optical fibre according to claim 2, wherein the core or cores comprises or comprise one or more rare-earth materials.

37. An optical fibre according to claim 36, wherein the one or more rare-earth materials is/are selected from the group of materials comprising: Er, Yb, Nd, Tm, Er/Yb.

38. An optical fibre according to claim 2, wherein the core or cores comprises or comprise a photo-sensitive material.

39. An optical fibre according to claim 38, wherein the photo-sensitive material is germanium or boron-germanium or tin.

40. An optical fibre according to claim 2, wherein the core(s) comprises or is made of silica.

41. An optical fibre according to claim 2, wherein the outer cladding features of the first outer cladding region is arranged in a first background material made of a material having a softening temperature lower than the softening temperature of the background material of the core or material of the core itself.

42. An optical fibre according to claim 4, wherein the outer cladding features of the first outer cladding region is arranged in a first background material made of a material having a softening temperature lower than the softening temperature of the background material of the inner cladding.

43. An optical fibre according to claim 2, wherein the second outer cladding region comprises a second background material made of a material having a softening temperature being lower than the softening temperature of the background material of the core or material of the core itself.

44. An optical fibre according to claim 4, wherein the second outer cladding region comprises a second background material made of a material having a softening temperature being lower than the softening temperature of the background material of the inner cladding.

45. An optical fibre according to claim 41, wherein the softening temperature of the first background material or the second background material is at least 3% or at least 5% lower than the softening temperature of the background material of the core or material of the core itself.

46. An optical fibre according to claim 42, wherein the softening temperature of the first background material or the second background material is at least 3% or at least 5% lower than the softening temperature of the background material of the inner cladding.

47. An optical fibre according to claim 16, wherein the first background material comprises or is made of fluorine- or germanium-doped silica.

48. An optical fibre according to claim 17, wherein the second background material comprises or is made of fluorine- or germanium-doped silica.

49. An optical fibre according to claim 16, wherein a radial portion or a side portion of the first outer cladding region comprises a background material having a softening temperature being lower than the softening temperature of the background material of the remaining portion(s) of the first outer cladding region.

50. An optical fibre according to claim 17, wherein a radial portion or a side portion of the second outer cladding region comprises a background material having a softening temperature being lower than softening temperature of the background material of the remaining portion(s) of the second outer cladding region.

51. An optical fibre according to claim 49, wherein said radial portion or side portion of the first outer cladding region or the second outer cladding region comprises or is made of fluorine- or germanium-doped silica.

52. An optical fibre according to claim 49, wherein the difference in softening temperature is at least 3% or at least 5%.

53. An optical fibre according to claim 41, wherein the softening temperature is defined as the temperature where the viscosity of the material is around or equal to 107.6 dpa.sec (decaPascal.second).

54. An optical fibre according to claim 1, wherein the optical fibre comprises several cladding recesses providing optical access through the outer cladding.

55. An optical fibre according to claim 1, wherein the optical fibre comprises a tapered region, such that one or more higher-order modes in the core are suppressed.

56. A method producing an optical fibre with a cladding recess according to claim 1, the method comprising a step of removing a part of the outer cladding by dipping a part of the fibre in an acid solution.

57. A method according to claim 56, wherein the acid solution contains HF.

58. A method producing an optical fibre with a cladding recess according to claim 1, the method comprising a step of removing a part of the outer cladding by use of an etching gas.

59. A method according to claim 58, wherein the etching gas is a fluorinated or a chlorinated gas such as $SF_6$, $C_2F_6$, $CCl_2F_2$ or $Cl_2$ (Chlor).

60. A method producing an optical fibre with a cladding recess according to claim 1, the method comprising a step of removing a part of the outer cladding by a process of polishing a side part of the fibre.

61. A method producing an optical fibre with a cladding recess according to claim 1, the method comprising a step of removing a part of the outer cladding by use of a heat source for evaporation of a part of the outer cladding.

62. A method producing an optical fibre with a cladding recess according to claim 1, the method comprising a step of collapsing a part of the outer cladding features by use of a heat source.

63. A method according to claim 61, wherein the heat source includes a flame.

64. A method according to claim 61, wherein the heat source includes a laser.

65. A method according to claim 64, wherein the laser includes a $CO_2$ laser.

66. A method according to claim 61, wherein the heat source includes a resistive filament.

67. An apparatus comprising a length of a microstructured optical fibre with a cladding recess selected from the fibres according to claim 1, and coupling means being affixed or secured to a part of the fibre being uncovered by said cladding recess, said coupling means thereby being positioned for coupling light into the optical fibre via said cladding recess.

68. An apparatus according to claim 67, wherein the coupling means comprises a prism.

69. An apparatus according to claim 67, wherein the coupling means comprises a wedge.

70. An apparatus comprising a length of a microstructured optical fibre with a cladding recess selected from the fibres according to claim 1, wherein a groove or a series of grooves forming a grating are written in a part of the fibre being uncovered by said clad-ding recess.

71. An apparatus comprising a length of a first microstructured optical fibre with a first cladding recess selected from the fibres according to claim 1, wherein a first light coupling optical fibre is affixed or secured to a first part of the first microstructured fibre being uncovered by said first cladding recess, said first light coupling optical fibre thereby being brought into optical contact with the first microstructured optical fibre via said first cladding recess.

72. An apparatus according to claim 71, wherein the length of the first microstructured optical fibre further has a second cladding recess, and wherein a second light coupling optical fibre is affixed or secured to a second part of the first fibre being uncovered by said second cladding recess, said second light coupling optical fibre thereby being brought into optical contact with the first optical fibre via said second cladding recess.

73. An apparatus according to claim 71, wherein light is coupled into the first and/or second light coupling fibres and guided for being coupled into the first microstructured optical fibre.

74. An apparatus according to claim 71, wherein the first and/or second light coupling optical fibre is a multimode fibre.

75. An apparatus according to claim 71, wherein the first and/or second light coupling optical fibre is a microstructured optical fibre having a core and an outer cladding surrounding the core, said outer cladding comprising elongate outer cladding features extending in a fibre axial direction.

76. An apparatus according to claim 75, wherein for said first and/or second light coupling optical fibre, at least a part of the outer cladding features has been removed or collapsed in a recess part of the light coupling optical fibre being affixed or secured to the first microstructured optical fibre, so that optical contact from the first and/or second light coupling optical fibre to the first microstructured optical fibre is provided via the recess part of the first and/or second light coupling optical fibre and the first cladding recess and/or the second cladding recess of the first micro-structured optical fibre.

77. An apparatus according to claim 75, wherein the first and/or second light coupling optical fibre is a microstructured optical fibre with a cladding recess selected from fibres according to a microstructured optical fibre having an inner cladding and an outer cladding; said outer cladding including elongated outer cladding features extending in an axial direction of the fibre, wherein said elongated outer cladding features are at least partially removed over a length of the fibre in said axial direction thereby forming at least one cladding recess extending at least partly through the outer cladding in a radial direction to the inner cladding; said cladding recess providing optical access to the inner cladding.

78. An apparatus according to claim 71, wherein an end part of the first and/or second light coupling optical fibre is affixed or secured to the part of the first fibre being uncovered by said first cladding recess.

79. An apparatus according to claim 78, wherein said end part is angle polished.

80. An apparatus according to claim 78, wherein said end part is angle tapered.

81. An apparatus according to claim 71, wherein the light coupling optical fibre(s) is affixed or secured to the first fibre by use of a transparent resin.

82. An apparatus according to claim 71, wherein the light coupling optical fibre(s) is affixed or secured to the first fibre by fusion.

83. An apparatus comprising a length of a microstructured fibre with cladding recess according to claim 1, wherein said apparatus is a laser and/or amplifier.

84. An apparatus comprising a length of a microstructured fibre with cladding recess according to claim 1, wherein said optical fibre comprises at least two cladding recesses.

85. An apparatus according to claim 84, wherein said length of a microstructured optical fibre is adapted to be pumped from one or more ends of the microstructured optical fibre.

86. An apparatus according to claim 85, wherein said apparatus comprises at least one pump feeding element at each cladding recess.

87. An apparatus according to claim 83, wherein a first and a second neighbouring cladding recesses are adapted to couple pump light to said inner cladding so that the first of said neighbouring cladding recesses results in absorption of more than 50%, preferably more than 90% of the pump light coupled to said inner cladding by said first and second neighbouring cladding recesses; said absorption predominantly being absorption in the core of the optical fibre.

* * * * *